(12) United States Patent
Kramer

(10) Patent No.: US 7,477,845 B2
(45) Date of Patent: Jan. 13, 2009

(54) METHOD AND APPARATUS FOR REDUCING DATA BURST OVERHEAD IN AN ETHERNET PASSIVE OPTICAL NETWORK

(75) Inventor: Glen Kramer, Petaluma, CA (US)

(73) Assignee: Teknovus, Inc., Petaluma, CA (US)

( * ) Notice: Subject to any disclaimer, the term of this patent is extended or adjusted under 35 U.S.C. 154(b) by 909 days.

(21) Appl. No.: 10/820,663

(22) Filed: Apr. 7, 2004

(65) Prior Publication Data

US 2005/0041682 A1    Feb. 24, 2005

Related U.S. Application Data

(60) Provisional application No. 60/495,649, filed on Aug. 18, 2003.

(51) Int. Cl.
*H04J 14/00* (2006.01)

(52) U.S. Cl. ............... 398/71; 398/43; 398/66

(58) Field of Classification Search ............... 398/140, 398/168, 43, 66, 68, 70, 71, 72, 1, 165, 167.5, 398/721; 370/390, 351, 389, 431, 432; 348/E7.094; 359/135, 161
See application file for complete search history.

(56) References Cited

U.S. PATENT DOCUMENTS

| | | | | |
|---|---|---|---|---|
| 3,617,750 A | * | 11/1971 | Walker | 398/116 |
| 4,658,394 A | * | 4/1987 | Cheng et al. | 398/70 |
| 5,357,360 A | * | 10/1994 | Imhoff et al. | 398/100 |
| 5,559,624 A | * | 9/1996 | Darcie et al. | 398/72 |
| 5,790,287 A | * | 8/1998 | Darcie et al. | 398/108 |
| 7,301,970 B2 | * | 11/2007 | Kim et al. | 370/535 |
| 2002/0063932 A1 | * | 5/2002 | Unitt et al. | 359/168 |
| 2003/0007210 A1 | * | 1/2003 | Kenny | 359/135 |
| 2003/0137975 A1 | * | 7/2003 | Song et al. | 370/353 |
| 2004/0109688 A1 | * | 6/2004 | Kim et al. | 398/68 |
| 2004/0208571 A1 | * | 10/2004 | Shahar et al. | 398/79 |
| 2005/0041682 A1 | * | 2/2005 | Kramer | 370/458 |
| 2005/0058452 A1 | * | 3/2005 | Kramer et al. | 398/71 |
| 2005/0249498 A1 | * | 11/2005 | Haran et al. | 398/58 |

FOREIGN PATENT DOCUMENTS

| | | |
|---|---|---|
| EP | 1 094 628 | 10/2000 |
| EP | 1094628 A2 * | 4/2001 |
| EP | 1 231 813 | 8/2001 |
| EP | 1231813 A2 * | 8/2002 |

* cited by examiner

*Primary Examiner*—Kwang B. Yao
*Assistant Examiner*—Maxwell A Clark
(74) *Attorney, Agent, or Firm*—Park, Vaughan & Fleming LLP; Shun Yao

(57) ABSTRACT

A system is provided to reduce data burst overhead in an Ethernet passive optical network. During operation, the OLT transmits grant messages to a number of ONUs, wherein a grant message assigns a start time and a duration of a transmission timeslot in which an GNU may transmit an upstream data burst. In response to the grant messages, the OLT receives a number of upstream data bursts, wherein the time gap between two consecutive upstream data bursts is less than the summation of a default laser turn-on time, a default laser turn-off time, an AGC period, and a CDR period.

30 Claims, 12 Drawing Sheets

US 7,477,845 B2

METHOD AND APPARATUS FOR REDUCING DATA BURST OVERHEAD IN AN ETHERNET PASSIVE OPTICAL NETWORK

RELATED APPLICATION

This application hereby claims priority under 35 U.S.C. §119 to U.S. Provisional Patent Application No. 60/495,649 filed on 18 Aug. 2003, entitled "Method for Timeslot Allocation to Reduce Guard Band Overhead in Ethernet Passive Optical Networks," by inventor Glen Kramer.

BACKGROUND

1. Field of the Invention

The present invention relates to the design of Ethernet passive optical networks. More specifically, the present invention relates to a method and apparatus for reducing data burst overhead in an Ethernet passive optical network.

2 Related Art

In order to keep pace with increasing Internet traffic, optical fibers and associated optical transmission equipment have been widely deployed to substantially increase the capacity of backbone networks. However, this increase in the capacity of backbone networks has not been matched by a corresponding increase in the capacity of access networks. Even with broadband solutions, such as digital subscriber line (DSL) and cable modem (CM), the limited bandwidth offered by current access networks creates a severe bottleneck in delivering high bandwidth to end users.

Among the different technologies that are presently being developed, Ethernet passive optical networks (EPONs) are one of the best candidates for next-generation access networks. EPONs combine ubiquitous Ethernet technology with inexpensive passive optics. Hence, they offer the simplicity and scalability of Ethernet with the cost-efficiency and high capacity of passive optics. In particular, due to the high bandwidth of optical fibers, EPONs are capable of accommodating broadband voice, data, and video traffic simultaneously. Such integrated service is difficult to provide with DSL or CM technology. Furthermore, EPONs are more suitable for Internet Protocol (IP) traffic, because Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. Logically, the first mile is a point-to-multipoint network, with a central office servicing a number of subscribers. A tree topology can be used in an EPON, wherein one fiber couples the central office to a passive optical splitter, which divides and distributes downstream optical signals to subscribers and combines upstream optical signals from subscribers (see FIG. 1).

Transmissions within an EPON are typically performed between an optical line terminal (OLT) and optical networks units (ONUs) (see FIG. 2). The OLT generally resides in the central office and couples the optical access network to a metro backbone, which is typically an external network belonging to an Internet Service Provider (ISP) or a local exchange carrier. An ONU can be located either at the curb or at an end-user location, and can provide broadband voice, data, and video services. ONUs are typically coupled to a one-by-N (1×N) passive optical coupler, where N is the number of ONUs, and the passive optical coupler is typically coupled to the OLT through a single optical link. (Note that one may use a number of cascaded optical splitters/couplers.) This configuration can save significantly in the number of fibers and amount of hardware required by EPONs.

Communications within an EPON can be divided into downstream traffic (from OLT to ONUs) and upstream traffic (from ONUs to OLT). In the downstream direction, because of the broadcast nature of the 1×N passive optical coupler, downstream data frames are broadcast by the OLT to all ONUs and are subsequently extracted by their destination ONUs. In the upstream direction, the ONUs need to share channel capacity and resources, because there is only one link coupling the passive optical coupler with the OLT.

Correspondingly, an EPON typically employs some arbitration mechanism to avoid data collision and to provide fair sharing of the upstream fiber-channel capacity. This is achieved by allocating a transmission timeslot to each ONU. An ONU typically buffers data it receives from a subscriber until it reaches the start time of its transmission timeslot. When its turn arrives, the ONU "bursts" all stored frames to the OLT at full channel speed.

Due to unequal distances between an OLT and ONUs, optical signal attenuation in an EPON is not the same for each ONU. The power level received at the OLT could be different for each transmission timeslot. This is called the near-far problem. If the receiver in the OLT is adjusted to receive a high-power signal from a closely located ONU, it may mistakenly read a "one" as a "zero" when receiving a weaker signal from a distant ONU. Similarly, if the receiver is adjusted to a weak signal, it may read a "zero" as a "one" when receiving a stronger signal. To detect an incoming signal properly, the OLT receiver is ideally given a short period to adjust its zero-one threshold, which is called the automatic gain control (AGC) period, at the beginning of each timeslot. In addition, another period is usually reserved after the AGC period for the receiver to synchronize its clock with the incoming bits. A clock and data recovery (CDR) circuit is responsible for the bit-synchronization.

Another issue is that it is not enough just to disallow an ONU from sending data outside its assigned transmission timeslot. Even in the absence of data transmission, an ONU's laser generates spontaneous emission noise when powered on. Accumulated spontaneous emission noise from several ONUs close to the OLT can easily obscure the signal from a distant ONU (this is called the capture effect). Thus, an ONU ideally shuts down its laser between its transmission timeslots. Because a laser takes time to cool down when turned off, and to warm up when turned on, its emitted power may fluctuate at the beginning and the end of a transmission. Therefore, a laser turn-on period and a laser turn-off period are typically reserved for the laser to stabilize.

During the laser turn-on, turn-off, AGC, and CDR periods an ONU cannot transmit payload data. This data burst overhead makes the upstream bandwidth utilization less efficient. Hence, what is needed is a method and apparatus for reducing data burst overhead in an Ethernet passive optical network.

SUMMARY

Embodiments of the present invention provide an EPON system that facilitates reduced overhead between upstream data busts. In one embodiment of the present invention, an OLT transmits grant messages to a number of ONU, wherein a grant message for a specified ONU assigns a start time and a duration of a transmission timeslot in which the ONU may transmit an upstream data burst. In response to the grant messages, the OLT then receives a number of upstream data bursts, wherein the time gap between two consecutive upstream data bursts is less than the summation of a default laser turn-on time, a default laser turn-off time, an AGC period, and a CDR period.

In a variation of this embodiment, a preceding upstream data burst's laser turn-off period overlaps with a subsequent data burst's laser turn-on period.

In a further variation, the non-overlapping portion of the preceding data burst's laser turn-off period is equal to or greater than twice the allowed maximum jitter of the round-trip time between the central node and a remote node. In addition, the non-overlapping portion of the subsequent data burst's laser turn-on period is equal to or greater than twice the allowed maximum jitter of the round-trip time between the central node and a remote node.

In a further variation, a grant message specifies a transmission timeslot start time that is earlier than the ending time of an immediately preceding transmission timeslot.

In a variation of this embodiment, a remote node is allowed to transmit the number of consecutive data bursts without turning off and turning on its laser between two consecutive data bursts.

In a further variation, a remote node detects the time gap between two consecutive transmission timeslots assigned to the remote node. If the time gap is less than a pre-defined value, the remote node transmits upstream data during the time gap without turning off and turning on its laser.

In a variation of this embodiment, if one or more remote nodes are virtual remote nodes located in a common physical remote node, and if these virtual remote nodes transmit upstream data through a common laser belonging to the common physical remote node, the physical remote node allows the common laser to keep transmitting upstream data without being turned off between consecutive transmission timeslots assigned to one or more virtual remote nodes located in the common physical remote node.

In a further variation, a grant message contains a laser-turn-on flag and a laser-turn-off flag. If a grant message's laser-turn-on flag is true, the corresponding remote node turns on its laser at the start time of its assigned transmission timeslot and transmits an AGC bit sequence and a CDR bit sequence before transmitting upstream data. If a grant message's laser-turn-on flag is false, the corresponding remote node immediately starts transmitting upstream data at the start time of its assigned transmission timeslot without transmitting an AGC bit sequence and a CDR bit sequence. If a grant message's laser-turn-off flag is true, the corresponding remote node turns off its laser after transmitting upstream data. If a grant message's laser-turn-off flag is false, the corresponding remote node continues transmitting data until the end of its assigned transmission timeslot without turning off its laser.

In a further variation, if one or more remote nodes are virtual remote nodes located in a common physical remote node, and if these virtual remote nodes transmit upstream data through a common laser belonging to the common physical remote node, the physical remote node allows the common laser to keep transmitting the upstream data bursts without being turned off between consecutive transmission timeslots assigned to one or more virtual remote nodes located in the common physical remote node.

In a variation of this embodiment, the central node receives an actual laser turn-on time and an actual laser turn-off time from a remote node; wherein the actual laser turn-on and turn-off times specify the amount of time required by the remote node to turn on and turn off its laser, respectively.

In a further variation, the actual laser turn-on and turn-off times are transmitted with a registration message from the remote node when the central node initially registers the remote node.

In a further variation, a grant message assigns the start time and duration of a transmission timeslot based on the actual laser turn-on and turn-off times of the remote node to which the grant message is destined.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

The data structures and procedures described in this detailed description are typically stored on a computer readable storage medium, which may be any device or medium that can store code and/or data for use by a computer system. This includes, but is not limited to, application specific integrated circuits (ASICs), field-programmable gate arrays (FPGAs), semiconductor memories, magnetic and optical storage devices such as disk drives, magnetic tape, CDs (compact discs) and DVDs (digital versatile discs or digital video discs).

Passive Optical Network Topology

Figure 1:
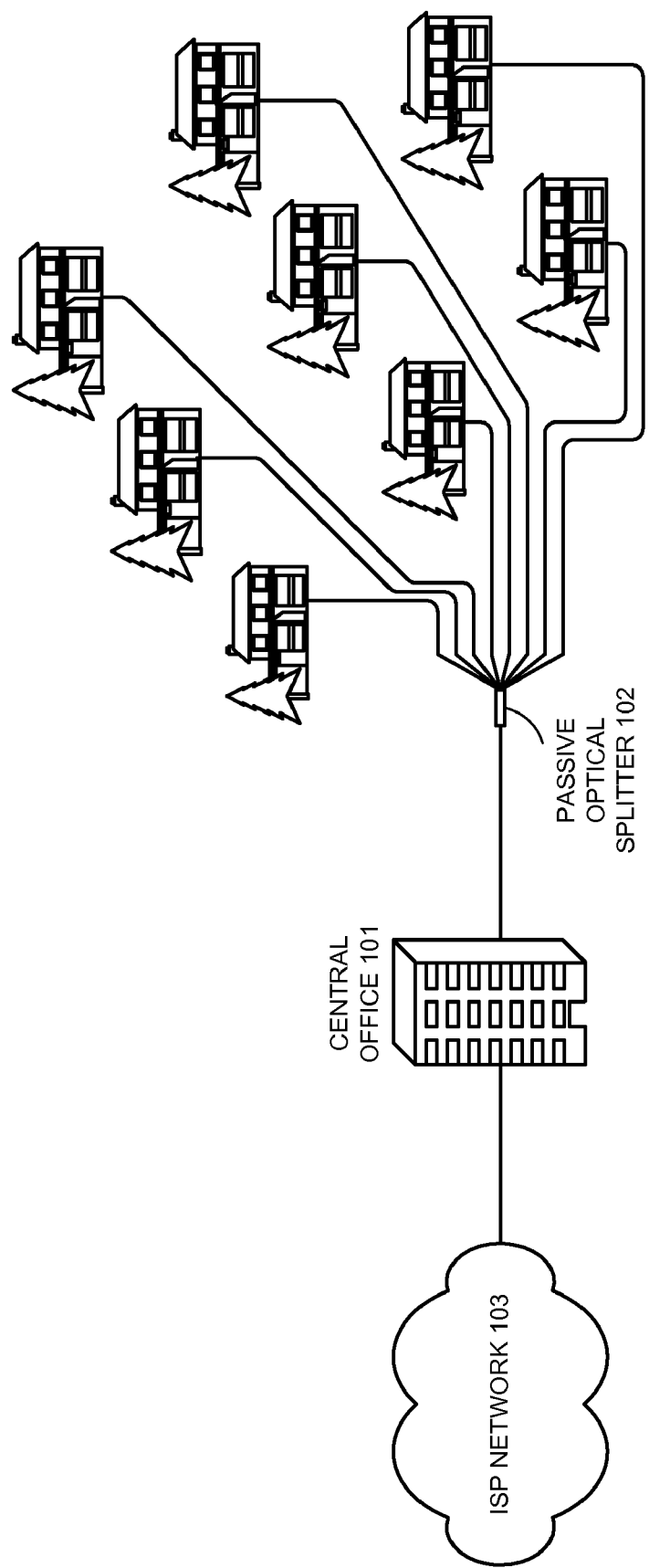
FIG. 1 illustrates an Ethernet passive optical network wherein a central office and a number of subscribers are coupled through optical fibers and an Ethernet passive optical splitter (prior art).

FIG. 1 illustrates a passive optical network, wherein a central office and a number of subscribers are coupled together through optical fibers and a passive optical splitter (prior art). As shown in FIG. 1, a number of subscribers are coupled to a central office 101 through optical fibers and a passive optical splitter 102. Passive optical splitter 102 can be placed in the vicinity of end-user locations, so that the initial fiber deployment cost is minimized. Central office 101 can be coupled to an external network 103, such as a metropolitan area network operated by an Internet service provider (ISP). Note that although FIG. 1 illustrates a tree topology, a PON can also be based on other topologies, such as a ring or a bus.

Normal Operation Mode in EPON

Figure 2:
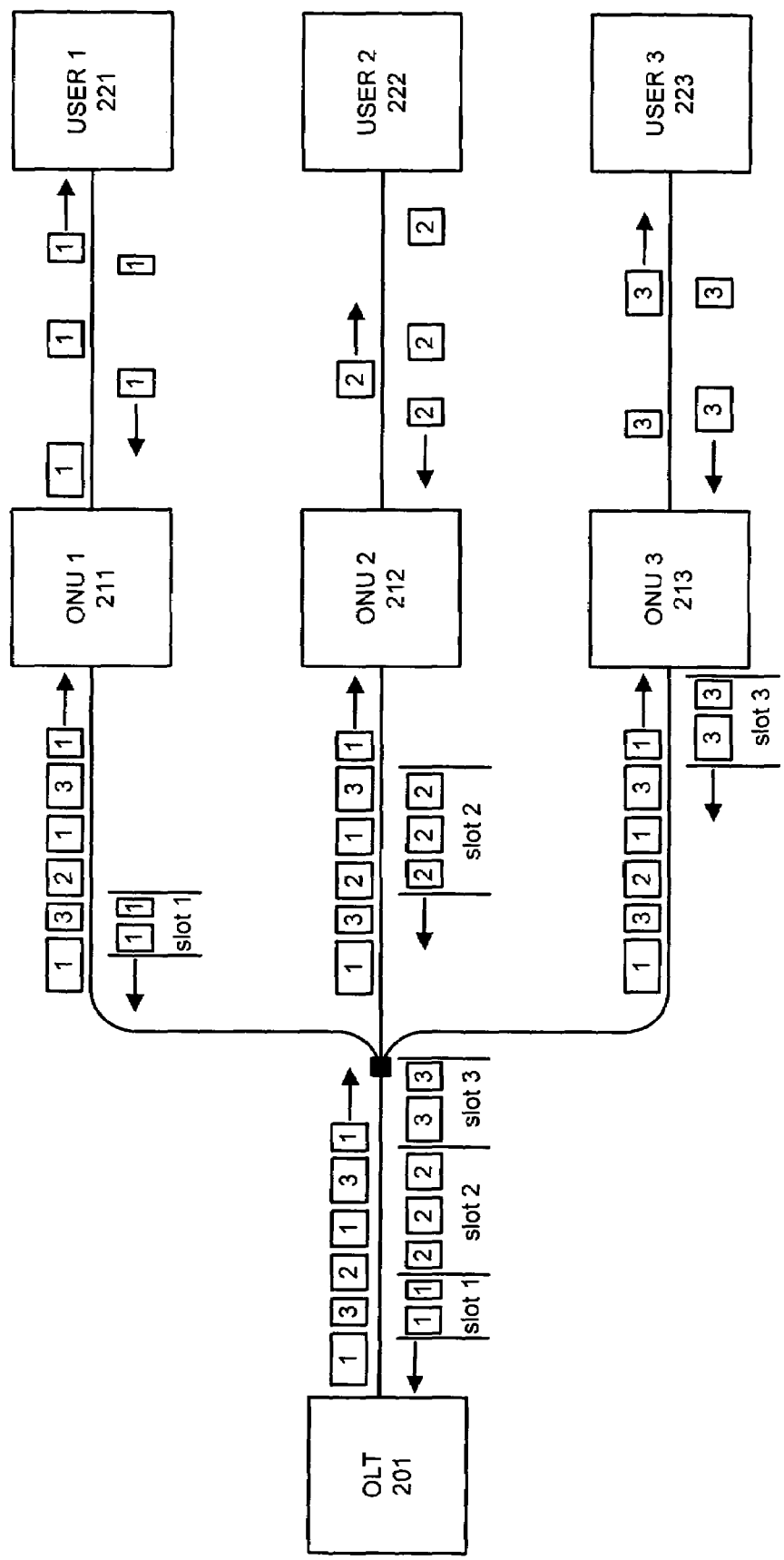
FIG. 2 illustrates an EPON in normal operation mode (prior art).

FIG. 2 illustrates an EPON in normal operation mode (prior art). To allow ONUs to join an EPON at arbitrary times, an EPON typically has two modes of operation: a normal operation mode and a discovery (initialization) mode. Normal operation mode accommodates regular upstream data transmissions, where an OLT assigns transmission opportunities to all initialized ONUs.

As shown in FIG. 2, in the downstream direction, OLT 201 broadcasts downstream data to ONU 1 (211), ONU 2 (212), and ONU 3 (213). While all ONUs may receive the same copy of downstream data, each ONU selectively forwards only the data destined to itself to its corresponding users, which are user 1 (221), user 2 (222), and user 3 (223), respectively.

In the upstream direction, OLT 201 first schedules and assigns transmission timeslots to each ONU according to the ONU's service-level agreement. When not in its transmission timeslot, an ONU typically buffers the data received from its user. When its scheduled transmission timeslot arrives, an ONU transmits the buffered user data within the assigned transmission window.

Figure 3:
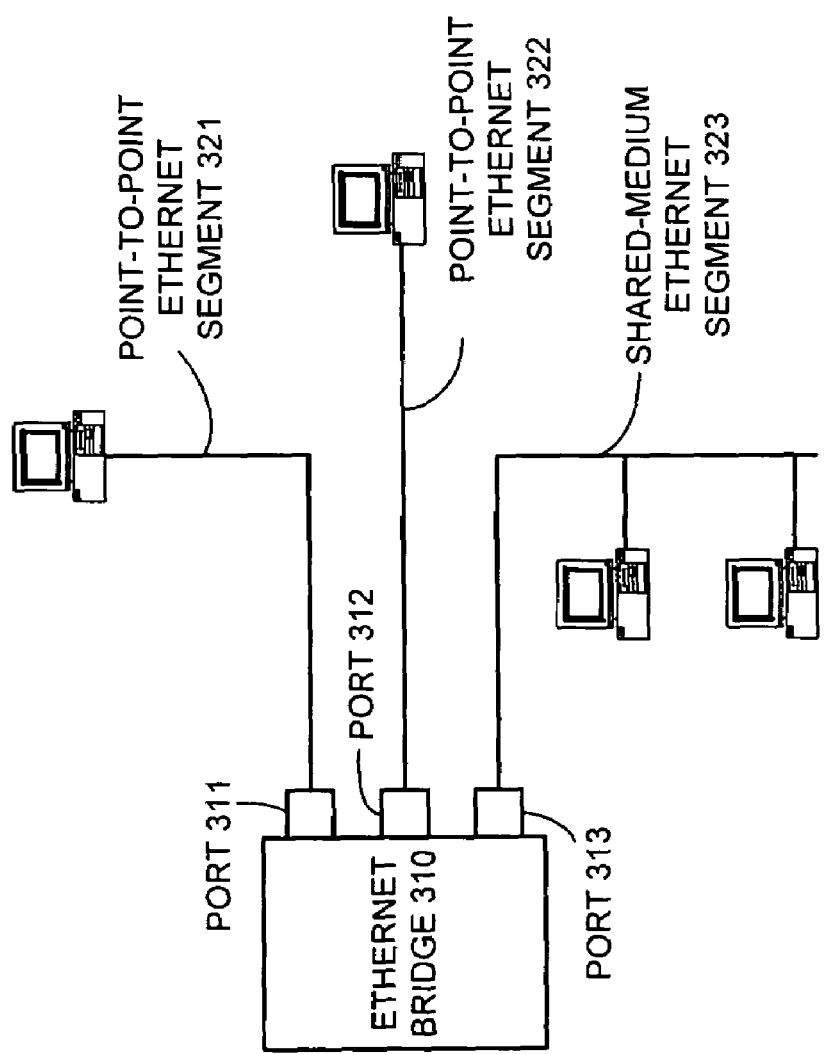
FIG. 3 illustrates bridged Ethernet segments (prior art).

Since every ONU takes turns in transmitting upstream data according to the OLT's scheduling, the upstream link's capacity can be efficiently utilized. However, for the scheduling to work properly, the OLT needs to discover and initialize a newly joined ONU. During discovery, the OLT may collect information critical to transmission scheduling, such as the ONU's round-trip time (RTT), its media access control (MAC) address, its service-level agreement, etc. (Note that in some cases service-level agreement may already be known to the OLT), General Ethernet Requirement FIG. 3 illustrates bridged Ethernet segments (prior art). The IEEE 802 standards allow an Ethernet segment to operate in a point-to-point mode. In a point-to-point Ethernet segment, a link couples two hosts, or a host and an Ethernet bridge. Point-to-point mode is a common form of operation in a switched Ethernet, such as Gigabit Ethernet.

When multiple Ethernet hosts need to communicate with one another, an Ethernet bridge typically couples and switches between multiple point-to-point Ethernet segments to allow inter-segment communications. As shown in FIG. 3, Ethernet bridge 310 has multiple ports. Point-to-point segments 321 and 322 are coupled to ports 311 and 312, respectively. Shared-medium segment 323 is coupled to port 313. If the host on segment 322 sends a data frame to the host on segment 321, the data frame will be switched by Ethernet bridge 310 from port 312 to port 311 according to its destination Ethernet (MAC) address.

Shared-medium segment 323 operates differently from point-to-point segments. The IEEE 802 architecture generally assumes that all devices connected to the same medium can communicate to each other directly. Relying on this assumption, bridges never forward a frame back to its ingress port. In the example shown in FIG. 3, if the hosts on segment 323 needs to communicate with each other, Ethernet bridge 310 does not forward any of these frames, because it assumes that all the hosts coupled to the same port can directly communicate with one another over the shared medium.

Point-to-Point Emulation (PtPE) in EPON

In an EPON, because the upstream transmission from an ONU to the OLT is point-to-point communication, the operation of EPON ideally conforms to the point-to-point Ethernet operation as defined by the IEEE 802 standard. However, the EPON architecture does not automatically satisfy the requirement of bridged point-to-point Ethernet: if the EPON upstream link is coupled to one Ethernet bridge port, and all the upstream traffic is received at that port, users connected to different ONUs on the same EPON will be unable to communicate with one another. The Ethernet bridge located within the OLT will not switch among the upstream data, because they are received at the same port. Such a configuration forces data traffic among ONUs within the same EPON to be processed on layer 3 (network layer) and switched by equipment that resides outside the EPON (e.g., an IP router to which the OLT is connected). This is a very inefficient way of delivering intra-EPON traffic.

To resolve this problem, and to ensure seamless integration of an EPON with other Ethernet networks, devices attached to the EPON medium ideally have an additional sub-layer that can emulate a point-to-point medium. This sub-layer is referred to as Point-to-Point Emulation (PtPE) sub-layer. This emulation sub-layer resides below the MAC layer to preserve existing Ethernet MAC operation defined in the IEEE P802.3 standards. Operation of this emulation layer relies on tagging Ethernet frames with tags unique for each ONU. These tags are called logic link IDs (LLIDs) and are placed in the preamble before each frame.

Figure 4A:
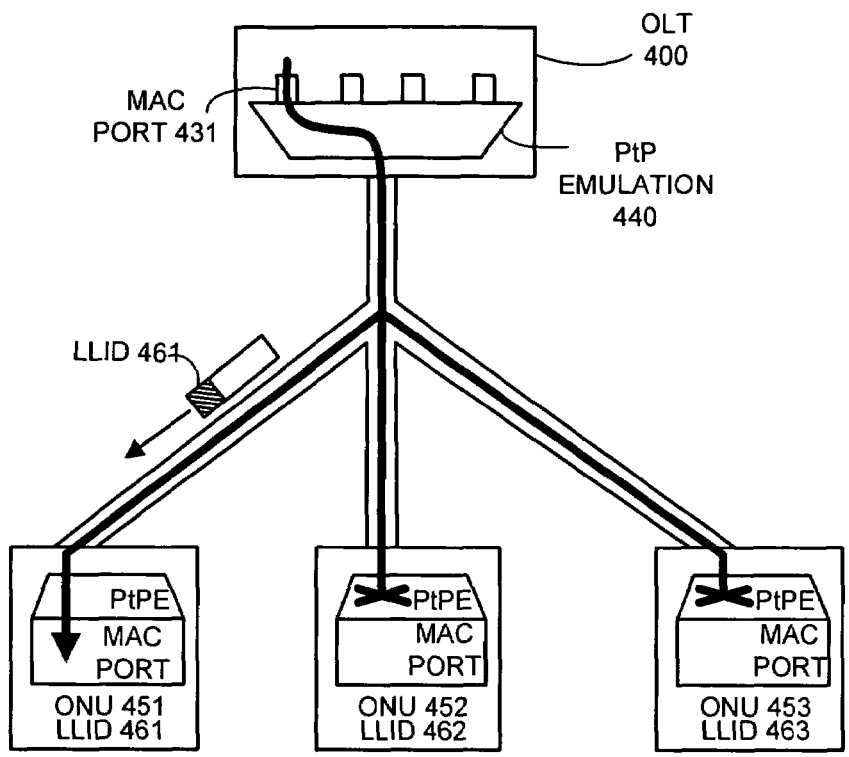
FIG. 4A illustrates transmission of downstream traffic with point-to-point emulation in an EPON (prior art).

FIG. 4A illustrates transmission of downstream traffic with point-to-point emulation in an EPON (prior art). In PtPE mode, OLT 400 has multiple MAC ports (interfaces), each of which corresponds to an ONU. When sending an Ethernet frame downstream from MAC port 431, PtPE sub-layer 440 in OLT 400 inserts LLID 461 which is associated with MAC port 431. Although the frame is broadcast through the passive optical coupler to every ONU, only the PtPE sub-layer module located within an ONU with a matching LLID (ONU 451 with LLID 461 in this example) will accept the frame and pass it to its MAC layer for further verification. MAC layers in other ONUs (ONU 452 with LLID 462, and ONU 453 with LLID 463) will never receive that frame. Accordingly, it appears as if the frame was sent on a point-to-point link to only the destination ONU.

Figure 4B:
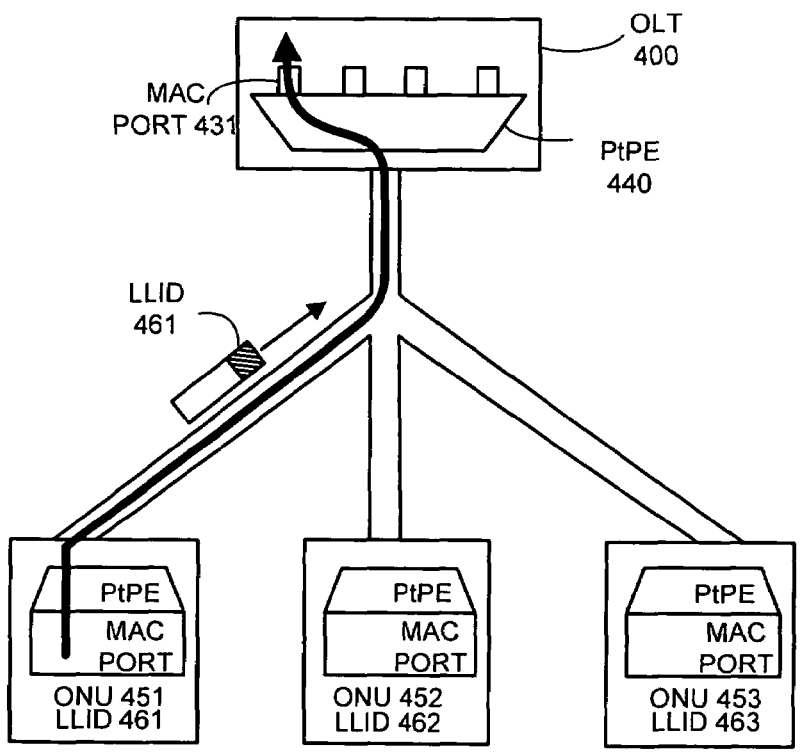
FIG. 4B illustrates transmission of upstream traffic with point-to-point emulation in an EPON (prior art).

FIG. 4B illustrates transmission of upstream traffic with point-to-point emulation in an EPON (prior art). In the upstream direction, ONU 451 inserts its assigned LLID 461 in the preamble of each transmitted frame. Accordingly, PtPE sub-layer 440 of OLT 400 disseminates the frame to MAC port 431.

Bridging in EPON

Figure 5:
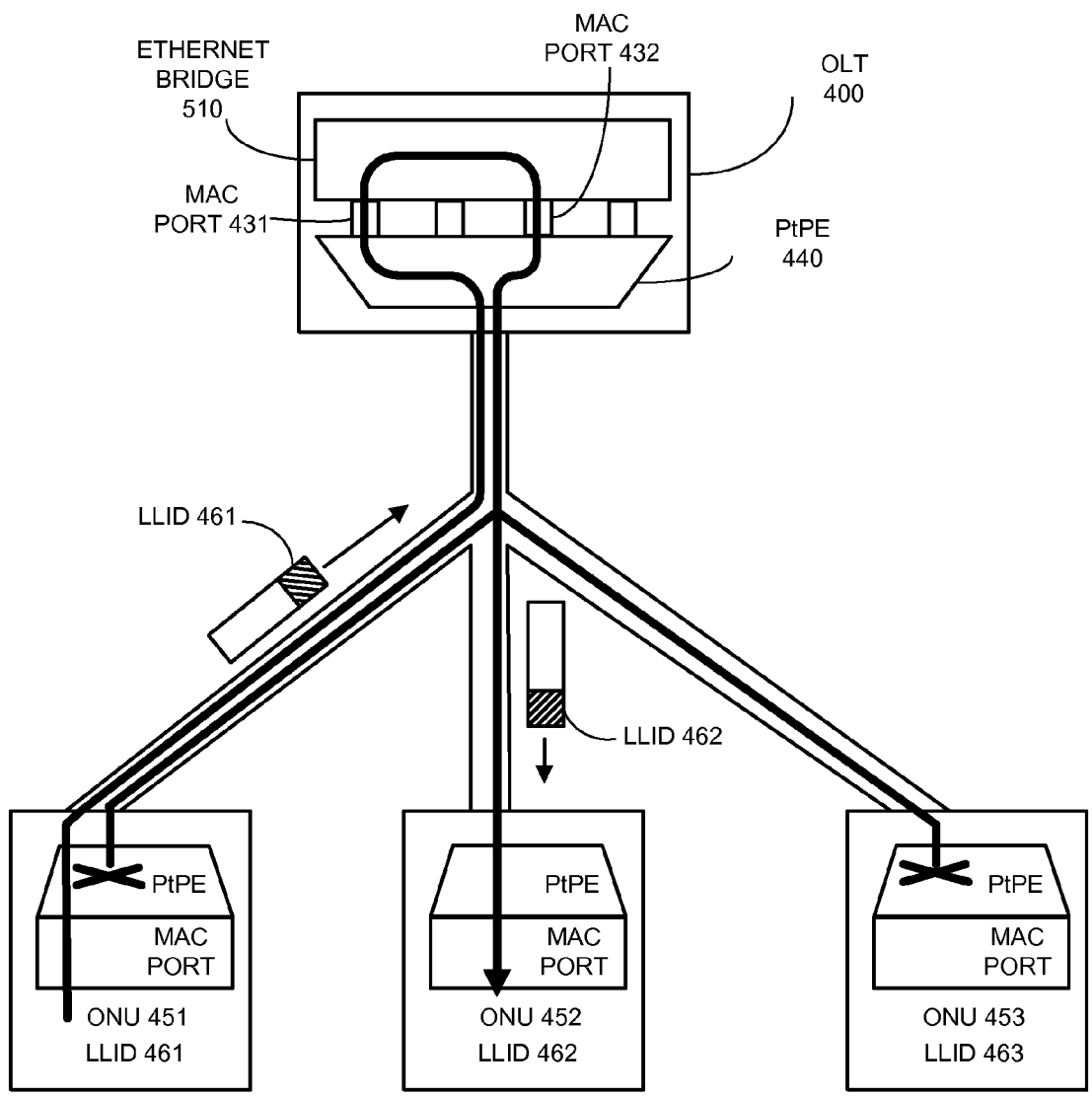
FIG. 5 illustrates bridging between ONUs with point-to-point emulation in an EPON (prior art).

FIG. 5 illustrates bridging between ONUs with point-to-point emulation in an EPON (prior art). In general, all frames transmitted (upstream and downstream) between OLT 400 and a certain ONU always have the LLID assigned to that ONU. Note that an LLID is only used to emulate a point-to-point link, not for switching or relaying frames. In this example, ONU 451 intends to send a frame to ONU 452. When the PtPE sub-layer 400 in OLT 400 receives this frame, it determines to which Ethernet-bridge port this frame should go, which is MAC port 431 and which is associated with LLID 461. PtPE sub-layer 400 also removes the frame's LLID 461. Subsequently, Ethernet bridge 510 inspects the destination MAC address of the frame and determines to which port the frame should be switched, as regular Ethernet bridge would do. It then forwards the frame to the port associated with ONU 452. PtPE sub-layer 400 in turn attaches to the downstream frame LLID 462, which is associated with ONU 452. Based on LLID 462, PtPE sub-layer in ONU 452 accepts this frame and delivers the frame to ONU 452.

Virtual ONUs

Figure 6:
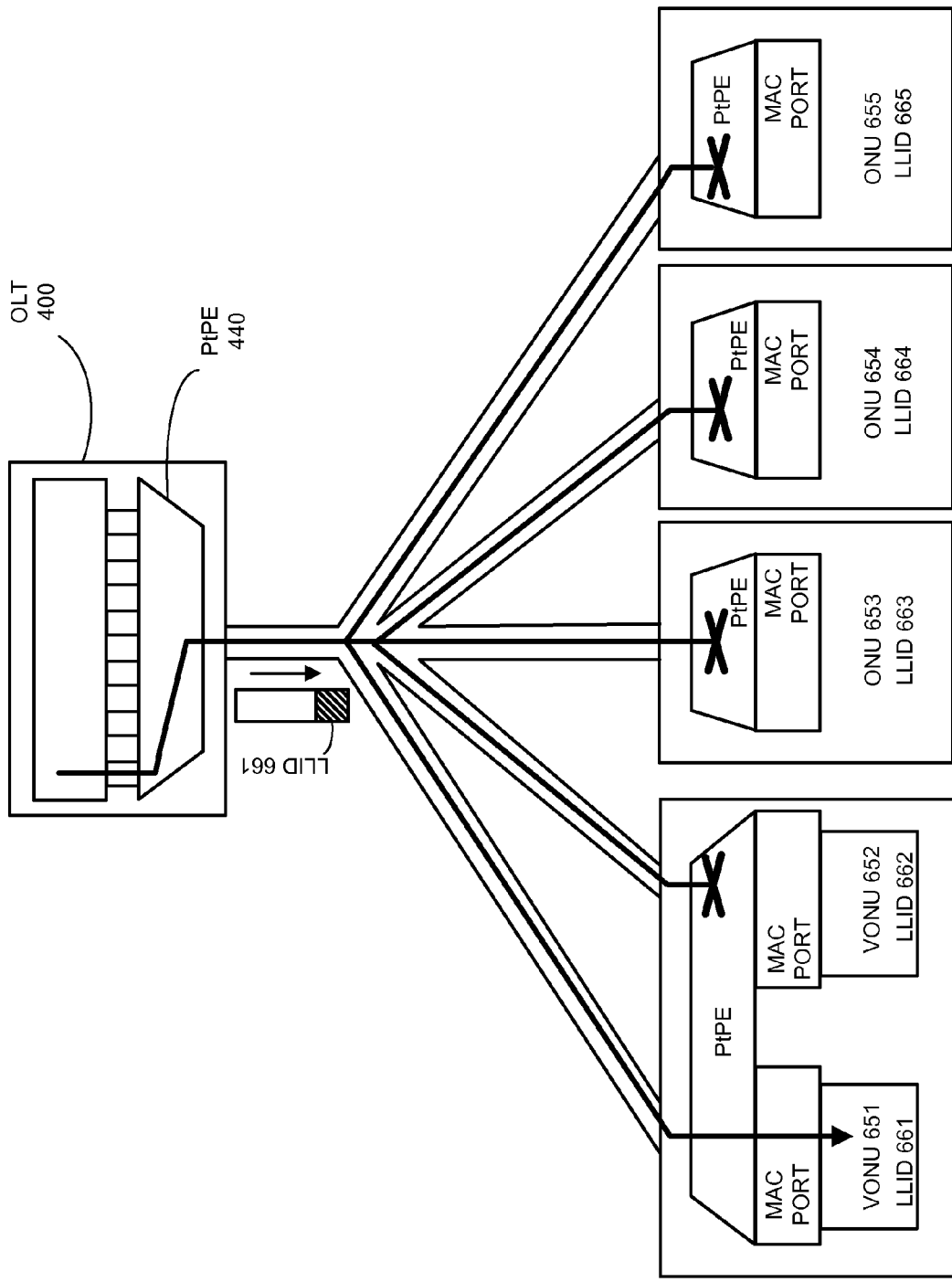
FIG. 6 illustrates virtual ONUs (VONUs) with logical links in an EPON (prior art).

FIG. 6 illustrates virtual ONUs (VONUs) with logical links in an EPON (prior art). One implementation of EPON may allow more than one LLID to be assigned to a physical ONU, wherein each LLID corresponds to an entity (e.g., a network device or an application) which needs a separate communication channel with the OLT. As shown in FIG. 6, a physical ONU 650 accommodates two virtual ONUs (VONUs) 651 and 652. VONU 651 and 652 have LLIDs 661 and 662, respectively. Correspondingly, ONU 650 has two MAC ports associated with VONU 651 and 652 respectively. In the same EPON, there may also exist separate physical ONUs, such as ONUs 653, 654, and 655 (with LLIDs 663, 664, and 665, respectively). During actual operation, OLT 400 does not distinguish VONUs from separate physical ONUs, and grants transmission slots to each VONU as if it was a separate physical ONU. For the reason stated above, the terms "VONU" and "ONU" are used interchangeably in the present invention.

Reducing Data Burst Overhead

Figure 7:
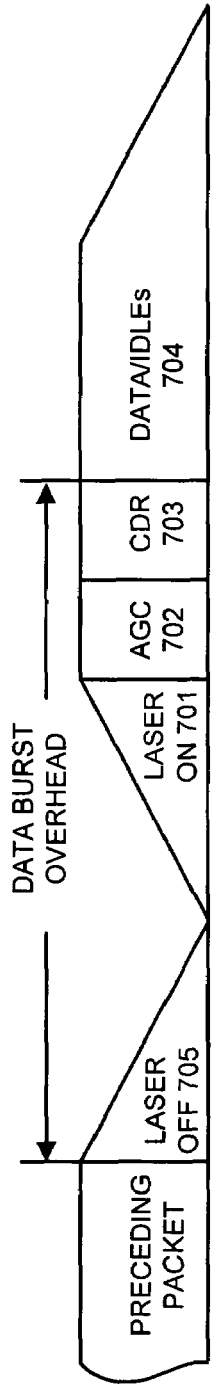
FIG. 7 illustrates the structure of a transmission timeslot in an EPON (prior art).

FIG. 7 illustrates the structure of a transmission timeslot in an EPON (prior art). An upstream data burst contained in a transmission timeslot is comprised of several parts beside its data payload. As shown in FIG. 7, the transmission timeslot may contain a laser turn-on period 701, an AGC bit sequence 702, a CDR bit sequence 703, a data/idle payload 704, and a laser turn-off period 705. Obviously, the useful portion of a transmission slot is the data/idle payload portion 704 which actually carries user data.

The non-payload portions of a transmission usually do not carry user data. In particular, the time gap comprising of laser turn-on, turn-off, AGC, and CDR periods imposes a non-negligible overhead to the transmission. It is desirable to reduce this data burst overhead to achieve higher bandwidth utilization.

Figure 8:
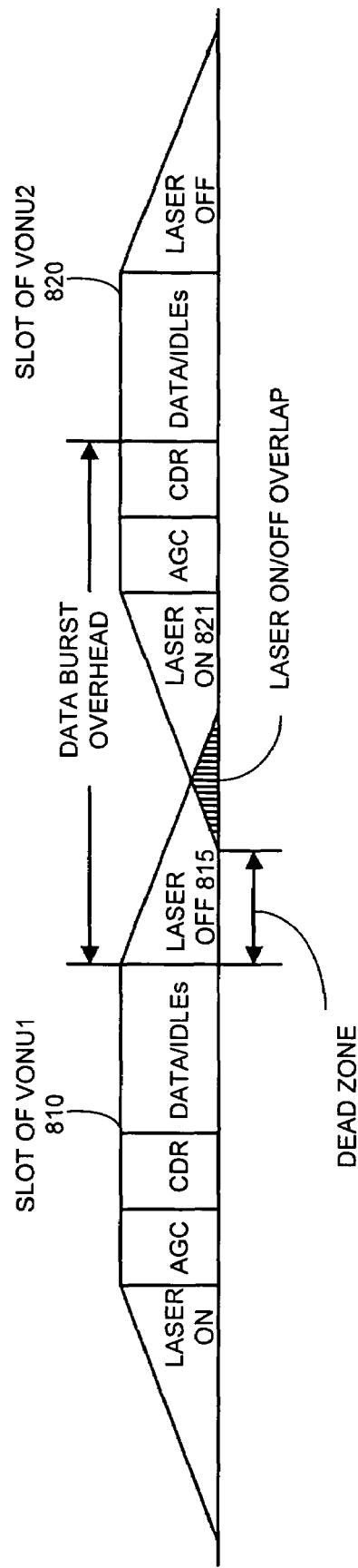
FIG. 8 illustrates an overlap of a laser turn-off period with the next transmission timeslot's laser turn-on period in accordance with an embodiment of the present invention.

FIG. 8 illustrates an overlap of a laser turn-off period with the next transmission timeslot's laser turn-on period in accordance with an embodiment of the present invention. One way to reduce data burst overhead, as shown in FIG. 8, is to schedule consecutive transmission timeslots 810 and 820 such that the laser turn-off period 815 of the preceding timeslot 810 overlaps the laser turn-on period 821 of the subsequent timeslot 820. The net result is reduced time gap between data bursts and hence a reduced data burst overhead.

The overlap of laser turn-off and turn-on periods can be complete or partial. In one embodiment of the present invention, there is a portion of the laser turn-on or turn-off period that is prohibited from overlapping. This portion is called "dead zone," as shown in FIG. 8. A dead zone can provide some buffer time for time jitter in the measured RTT between the OLT and a transmission ONU. Note that time jitter in the measured RTT during transmission may be caused by actual variations in the propagation delay and/or by devices from several networking layers, such as the physical layer (laser and receiver) and the MAC layer. A dead zone ensures that such time jitter does not corrupt the data payload of a preceding or subsequent transmission timeslot. In one embodiment of the present invention, the dead zone is at least twice the allowed maximum RTT jitter between the OLT and any ONU, such that the worst jitter scenario (wherein the preceding transmission is delayed and the subsequent transmission is early) can be accommodated.

Figure 9:
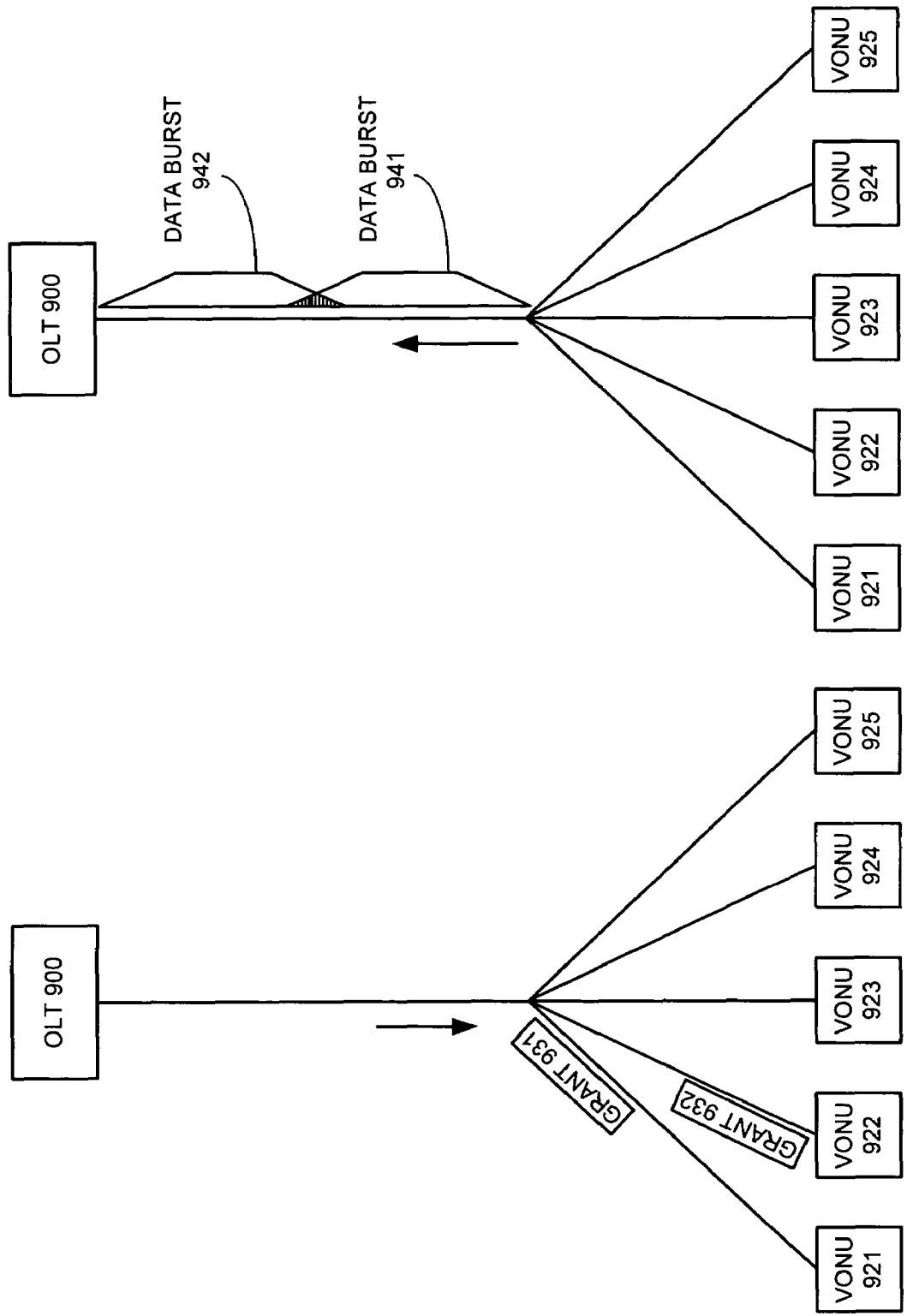
FIG. 9 illustrates an overlap of two transmission timeslots corresponding to two different VONUs in accordance with one embodiment of the present invention.

FIG. 9 illustrates an overlap of two transmission timeslots corresponding to two different VONUs in accordance with one embodiment of the present invention. This example shows an EPON comprising OLT 900, VONUs 921, 922, 923, 924, and 925. First, OLT 900 sends out two grant messages 931 and 932, which assign two consecutive timeslots to VONUs 921 and 922, respectively. The start time of the second timeslot (assigned to VONU 921) is earlier than the end time of the first timeslot (assigned to VONU 922). As a result, there is an overlap between the laser turn-off period of data burst 942 from VONU 922 and the laser turn-on period of data burst 941 from VONU 921.

Figure 10:
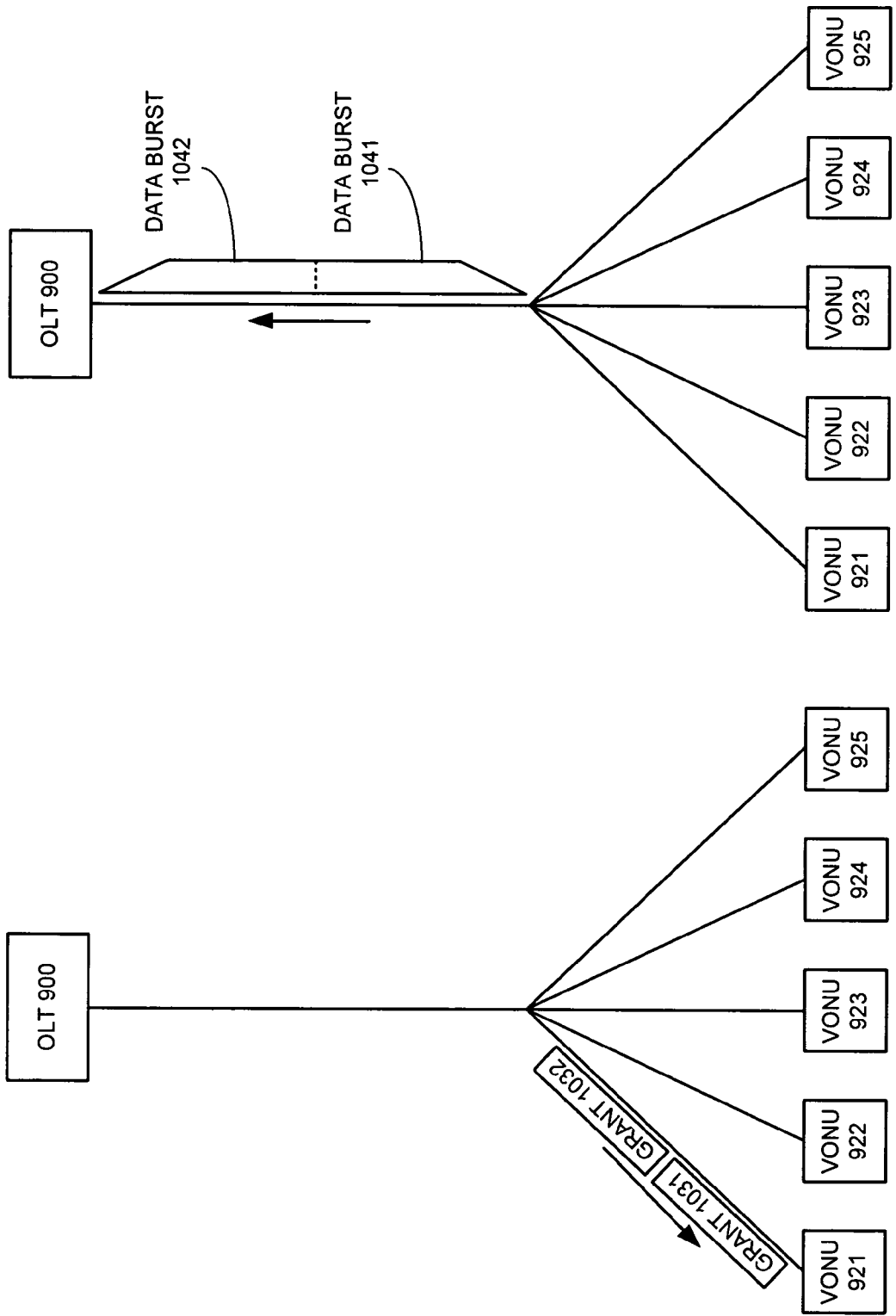
FIG. 10 illustrates the merging of two consecutive transmission timeslots assigned to one VONU in accordance with one embodiment of the present invention.

FIG. 10 illustrates the merging of two consecutive transmission timeslots assigned to one VONU in accordance with one embodiment of the present invention. Some scheduling protocols in an OLT may allow the OLT to grant consecutive transmission timeslots to one VONU. In such case, the VONU does not need to turn off its laser and then immediately turn it on. In addition, the VONU does not need to generate AGC and CDR bits, because the receiver in the OLT remains properly adjusted and synchronized. This approach may eliminate the data burst overhead between two consecutive timeslots assigned to the same VONU.

In the example shown in FIG. 10, OLT 900 issues two grant messages, 1031 and 1032, to the same VONU 921. As a result, VONU 921 keeps transmitting data bursts 1041 and 1042 without any break during the two timeslots.

In one embodiment of the present invention, a VONU may have knowledge of a minimum timeslot size. Therefore, if the time gap between two assigned timeslots to the same VONU is less that the minimum timeslot size, the VONU may conclude that it is granted consecutive timeslots and may transmit data continuously across the timeslot boundaries.

Figure 11:
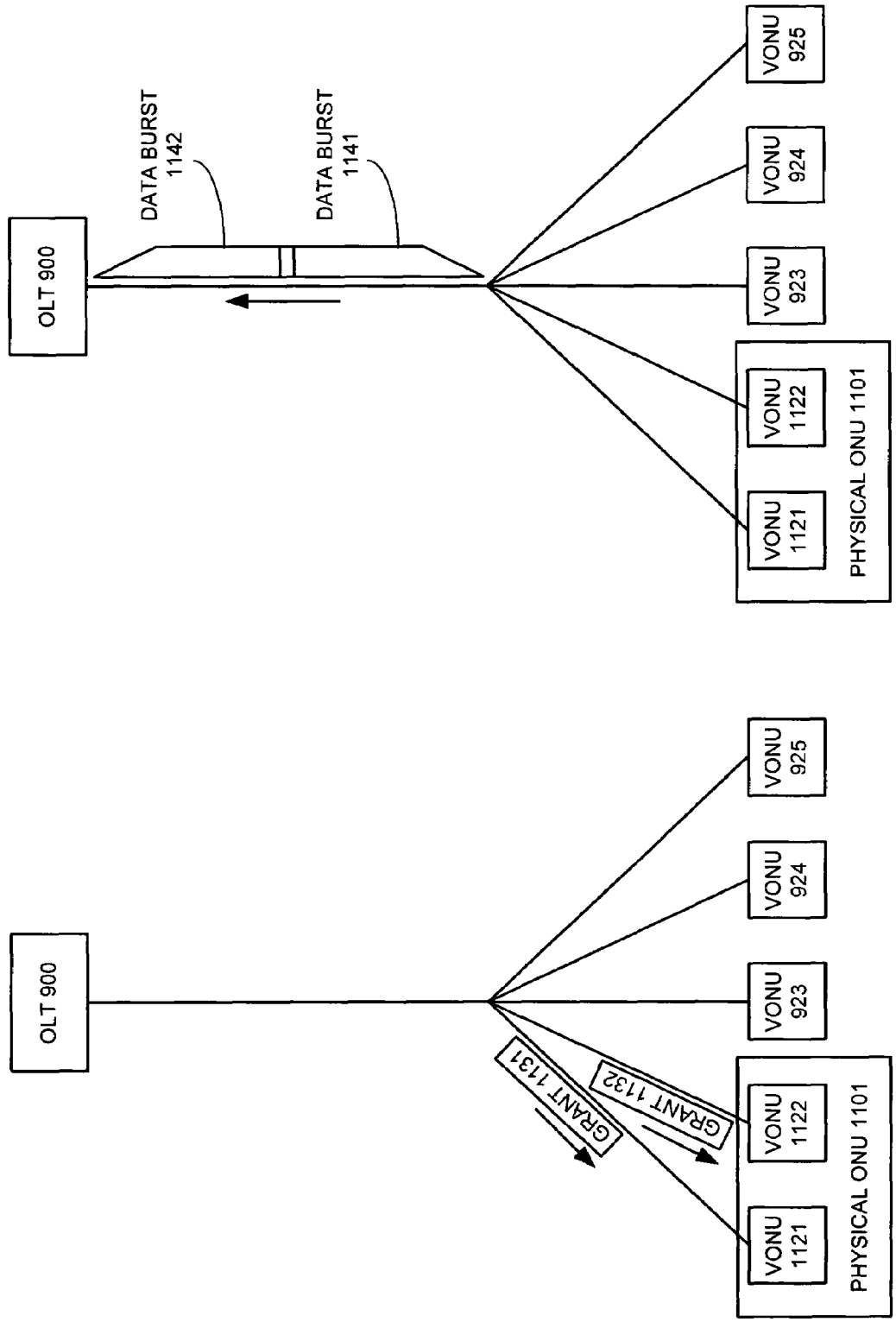
FIG. 11 illustrates the merging of two consecutive transmission timeslots assigned to two VONUs located in a common physical ONU in accordance with one embodiment of the present invention.

FIG. 11 illustrates the merging of two consecutive transmission timeslots assigned to two VONUs located in a common physical ONU in accordance with one embodiment of the present invention. As mentioned above, AGC and CDR bit sequences allow an OLT's receiver to adjust to a proper power level and to lock into the bit frequency of an incoming signal. However, sometimes multiple VONUs may belong to the same physical ONU and share a common laser. In this case both the power level and bit frequency remain the same for two consecutive timeslots assigned to VONUs located within the same physical ONU. Hence, it is possible to eliminate the data burst overhead between consecutive timeslots assigned to VONUs in one physical ONU.

In the example in FIG. 11, OLT 900 sends two consecutive grant messages 1032 and 1031 to VONUs 1122 and 1121, which belong to the same physical ONU 1101. Consequently, physical ONU 1101 transmits upstream data burst 1142 from VONU 1122 without turning off its laser at the end of the first timeslot. ONU 1101 then transmits upstream data burst 1141 from VONU 1121 without having to turn on its laser and transmit the AGC and CDR bit sequences at the beginning of the second timeslot.

In one embodiment of the present invention, to merge consecutive transmission timeslots assigned to VONUs located within the same physical ONU, a grant message may contain a START_ENABLED flag and a STOP_ENABLED flag. If the START_ENABLED flag is true, the corresponding VONU will perform a normal start sequence by turning on the laser and transmitting the AGC and CDR bit sequences. If the START_ENABLED flag is false, the VONU will start transmitting payload data immediately upon the start time of the assigned transmission timeslot.

Similarly, if the STOP_ENABLED flag is true, the VONU will turn off its laser such that the laser is completely off by the end time of the assigned transmission timeslot. If the STOP_ENABLED flag is false, the VONU will keep transmitting payload data until the end time of the assigned transmission timeslot without turning off the laser.

In the embodiment described above, the OLT ideally has knowledge of which VONUs belong to the same physical ONU. The OLT can either obtain this knowledge through a management channel, or through external configuration.

In another embodiment of the present invention, VONUs located within one physical ONU may transmit their upstream data through a common laser within the physical ONU. When the OLT assigns consecutive timeslots to these VONUs, the physical ONU will not turn off its laser between the slots. This approach does not require the OLT to be aware of which VONUs are within the same physical ONU, and does not require modification to the grant message.

Figure 12:
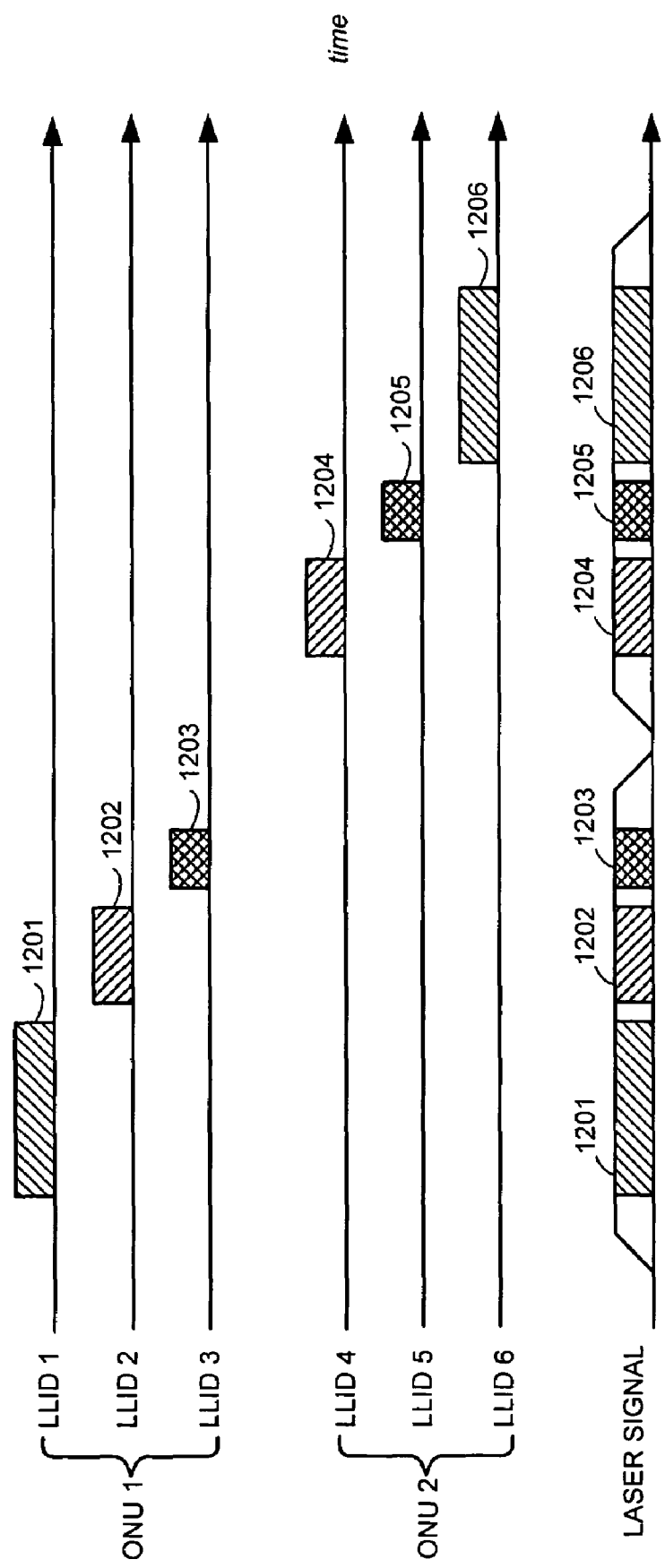
FIG. 12 presents a time-space diagram illustrating the merging of transmission timeslots assigned to multiple VONUs located in a common physical ONU in accordance with one embodiment of the present invention.

FIG. 12 presents a time-space diagram illustrating the merging of transmission timeslots assigned to multiple VONUs located in a common physical ONU in accordance with one embodiment of the present invention. In this example, physical ONU 1 and physical ONU 2 each have three VONUs. The VONUs in physical ONU 1 have LLIDs 1, 2, and 3, respectively. The VONUs in physical ONU 2 have LLIDs 4, 5, and 6 respectively. An OLT assigns consecutive timeslots 1201, 1202, and 1203 to LLIDs 1, 2, and 3, respectively. The OLT also assigns consecutive timeslots 1204, 1205, and 1206 to LLIDs 4, 5, and 6, respectively.

The laser within ONU 1 will keep transmitting data bursts according to the timeslots assigned to each LLID, without being turned off between the timeslots. Similarly, the laser in ONU 2 will keep transmitting upstream data within timeslots 1204, 1205, and 1206 without being turned off between the timeslots. In effect, transmissions from multiple VONUs in one physical ONU will be concatenated together and will look like one large timeslot. Thus, a physical ONU may reduce the overhead in its transmission.

Figure 13A:
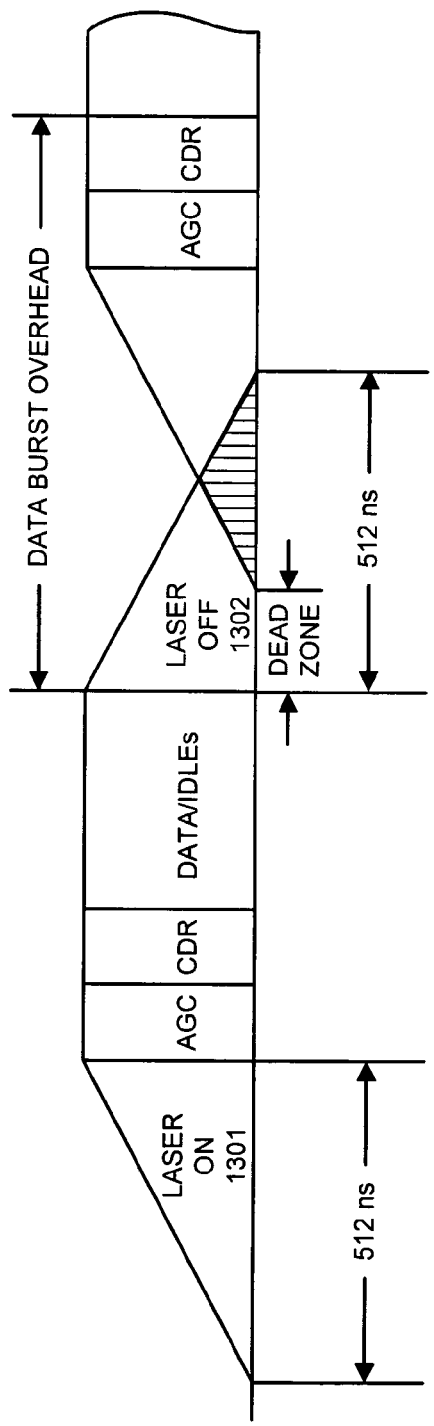
FIG. 13A illustrates a transmission timeslot the size of which is based on default laser turn-on and turn-off times.

FIG. 13A illustrates a transmission timeslot the size of which is based on default laser turn-on and turn-off times. Typically, as shown in FIG. 13A, an OLT assumes conservative default values for laser turn-on and turn-off times. In this example, both laser turn-on time 1301 and laser turn-off time 1302 are 512 ns.

Figure 13B:
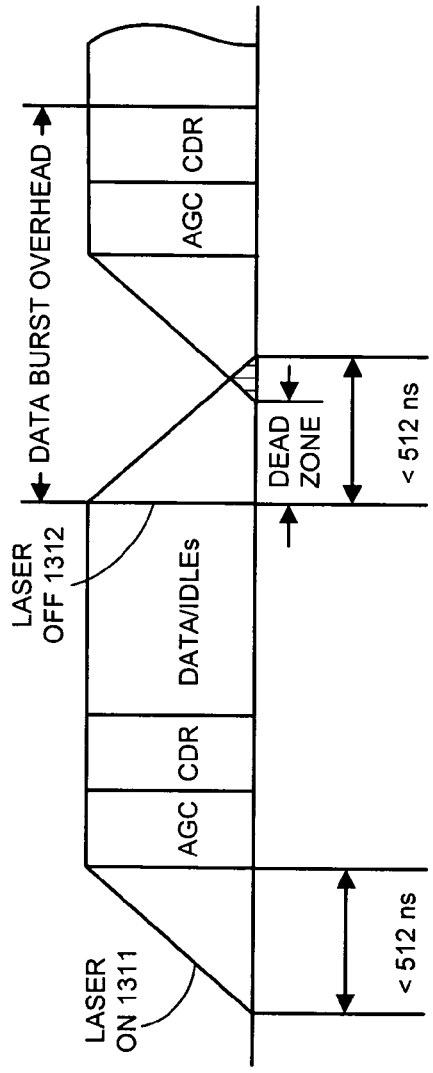
FIG. 13B illustrates a transmission timeslot the size of which is reduced based on actual laser turn-on and turn-off times in accordance with an embodiment of the present invention.

FIG. 13B illustrates a transmission timeslot the size of which is reduced based on actual laser turn-on and turn-off times in accordance with an embodiment of the present invention. In certain implementations, laser drivers may turn on and off a laser faster than the default times. Therefore, the data burst overhead can be reduced if an ONU communicates to the OLT its actual laser turn-on and turn-off times. The OLT may then place timeslots closer to each other. As shown in FIG. 13B, the actual laser turn-on time 1311 and turn-off time 1312 are both less than 512 ns. Hence, in the data burst overhead can be reduced compared with that shown in FIG. 13A. Note that, even when the actual laser turn-on and turn-off times are less than the default values, the dead zone remains the same if overlapping occurs.

In one embodiment of the present invention, an ONU communicates to an OLT its actual laser turn-on and turn-off times in a registration message when the OLT initially registers the ONU.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for reducing data burst overhead in an Ethernet passive optical network which includes a central node and at least one remote node, wherein downstream data from the central node is broadcast to the remote nodes, and wherein upstream data from each remote node is transmitted to the central node in a unicast manner, the method comprising:
   transmitting grant messages to a number of remote nodes, wherein a grant message for a specified remote node assigns a start time and a duration of a transmission timeslot in which the specified remote node may transmit a upstream data burst; and
   receiving a number of upstream data bursts, wherein the time gap between two consecutive upstream data bursts is less than the summation of a default laser turn-on time, a default laser turn-off time, an automatic gain control (AGC) period, and a clock and data recovery (CDR) period;
   wherein a preceding upstream data burst's laser turn-off period overlaps with a subsequent data burst's laser turn-on period;
   wherein the non-overlapping portion of the preceding data burst's laser turn-off period is equal to or greater than twice the allowed maximum jitter of the round-trip time between the central node and a remote node; and
   wherein the non-overlapping portion of the subsequent data burst's laser turn-on period is equal to or greater than twice the allowed maximum jitter of the round-trip time between the central node and a remote node.

2. The method of claim 1, wherein a grant message specifies a transmission timeslot start time that is earlier than the ending time of an immediately preceding transmission timeslot.

3. The method of claim 1, wherein receiving a number of upstream data bursts involves receiving a number of consecutive data bursts from a remote node, wherein the remote node is allowed to transmit the number of consecutive data bursts without turning off and turning on its laser between two consecutive data bursts.

4. The method of claim 3, further comprising detecting the time gap between two consecutive transmission timeslots assigned to the remote node; and
   if the time gap is less than a pre-defined value, allowing the remote node to transmit upstream data during the time gap without turning off and turning on its laser.

5. The method of claim 1, wherein if one or more remote nodes are virtual remote nodes located in a common physical remote node, and if these virtual remote nodes transmit upstream data through a common laser belonging to the common physical remote node, the method further comprises:
   allowing the common laser to keep transmitting upstream data without being turned off between consecutive transmission timeslots assigned to one or more virtual remote nodes located in the common physical remote node.

6. The method of claim 5, wherein a grant message contains a laser-turn-on flag and a laser-turn-off flag;
   wherein if a grant message's laser-turn-on flag is true, the corresponding remote node turns on its laser at the start time of its assigned transmission timeslot and transmits an AGC bit sequence and a CDR bit sequence before transmitting upstream data;
   wherein if a grant message's laser-turn-on flag is false, the corresponding remote node immediately starts transmitting upstream data at the start time of its assigned transmission timeslot without transmitting an AGC bit sequence and a CDR bit sequence;
   wherein if a grant message's laser-turn-off flag is true, the corresponding remote node turns off its laser after transmitting upstream data; and
   wherein if a grant message's laser-turn-off flag is false, the corresponding remote node continues transmitting data until the end of its assigned transmission timeslot without turning off its laser.

7. The method of claim 5, wherein if one or more remote nodes are virtual remote nodes located in a common physical remote node, and if these virtual remote nodes transmit upstream data through a common laser belonging to the common physical remote node, the method further comprises allowing the common laser to keep transmitting the upstream data bursts without being turned off between consecutive transmission timeslots assigned to one or more virtual remote nodes located in the common physical remote node.

8. The method of claim 1, further comprising receiving an actual laser turn-on time and an actual laser turn-off time from a remote node;
   wherein the actual laser turn-on and turn-off times specify the amount of time required by the remote node to turn on and turn off its laser, respectively.

9. The method of claim 8, wherein the actual laser turn-on and turn-off times are transmitted with a registration message from the remote node when the central node initially registers the remote node.

10. The method of claim 8, wherein a grant message assigns a start time and a duration of a transmission timeslot based on the actual laser turn-on and turn-off times of the remote node to which the grant message is destined.

11. An apparatus for reducing data burst overhead in an Ethernet passive optical network, comprising:
   at least one remote node; and
   a central node configured to,
      transmit grant messages to a number of remote nodes, wherein a grant message for a specified remote node assigns a start time and a duration of a transmission timeslot in which the specified remote node may transmit a upstream data burst; and
      receive a number of upstream data bursts, wherein the time gap between two consecutive upstream data bursts is less than the summation of a default laser turn-on time, a default laser turn-off time, an AGC period, and a CDR period;
   wherein the central node is configured to broadcast downstream data to the remote nodes;
   wherein each remote node is configured to transmit upstream data to the central node in a unicast manner.
   wherein a preceding upstream data burst's laser turn-off period overlaps with a subsequent data burst's laser turn-on period;
   wherein the non-overlapping portion of the preceding data burst's laser turn-off period is equal to or greater than twice the allowed maximum jitter of the round-trip time between the central node and a remote node; and
   wherein the non-overlapping portion of the subsequent data burst's laser
   turn-on period is equal to or greater than twice the allowed maximum jitter of the round-trip time between the central node and a remote node.

12. The apparatus of claim 11, wherein a grant message specifies a transmission timeslot start time that is earlier than the ending time of an immediately preceding transmission timeslot.

13. The apparatus of claim 11, wherein a remote node is configured to transmit a number of consecutive data bursts without turning off and turning on its laser between two consecutive data bursts.

14. The apparatus of claim 13, wherein the remote node is further configured to detect the time gap between two consecutive transmission timeslots assigned to the remote node; and
   if the time gap is less than a pre-defined value, allow the remote node to transmit upstream data during the time gap without turning off and turning on its laser.

15. The apparatus of claim 11, wherein if one or more remote nodes are virtual remote nodes located in a common physical remote node, and if these virtual remote nodes transmit upstream data through a common laser belonging to the common physical remote node, the common physical remote node is configured to:
   allow the common laser to keep transmitting upstream data without being turned off between consecutive transmission timeslots assigned to one or more virtual remote nodes located in the common physical remote node.

16. The apparatus of claim 15, wherein a grant message contains a laser-turn-on flag and a laser-turn-off flag;
   wherein if a grant message's laser-turn-on flag is true, the corresponding remote node is configured to turn on its laser at the start time of its assigned transmission timeslot and transmits an AGC bit sequence and a CDR bit sequence before transmitting upstream data;
   wherein if a grant message's laser-turn-on flag is false, the corresponding remote node is configured to start immediately transmitting upstream data at the start time of its assigned transmission timeslot without transmitting an AGC bit sequence and a CDR bit sequence;
   wherein if a grant message's laser-turn-off flag is true, the corresponding remote node is configured to turn off its laser after transmitting upstream data; and
   wherein if a grant message's laser-turn-off flag is false, the corresponding remote node is configured to continue transmitting data until the end of its assigned transmission timeslot without turning off its laser.

17. The apparatus of claim 15, wherein if one or more remote nodes are virtual remote nodes located in a common physical remote node, and if these virtual remote nodes transmit upstream data through a common laser belonging to the common physical remote node, the physical remote node is further configured to allow the common laser to keep transmitting the upstream data bursts without being turned off between consecutive transmission timeslots assigned to one or more virtual remote nodes located in the common physical remote node.

18. The apparatus of claim 11, wherein the central node is further configured to receive an actual laser turn-on time and an actual laser turn-off time from a remote node; and
   wherein the actual laser turn-on and turn-off times specify the amount of time required by the remote node to turn on and turn off its laser, respectively.

19. The apparatus of claim 18, wherein the actual laser turn-on and turn-off times are transmitted with a registration message from the remote node when the central node initially registers the remote node.

20. The apparatus of claim 18, wherein a grant message assigns a start time and a duration of a transmission timeslot based on the actual laser turn-on and turn-off times of the remote node to which the grant message is destined.

21. A computer-readable storage device storing instructions that when executed by a computer cause the computer to perform a method for reducing data burst overhead in an Ethernet passive optical network which includes a central node and at least one remote node, wherein downstream data from the central node is broadcast to the remote nodes, and wherein upstream data from each remote node is transmitted to the central node in a unicast manner, the method comprising:
   transmitting grant messages to a number of remote nodes, wherein a grant message for a specified remote node assigns a start time and a duration of a transmission timeslot in which the specified remote node may transmit a upstream data burst; and
   receiving a number of upstream data bursts, wherein the time gap between two consecutive upstream data bursts is less than the summation of a default laser turn-on time, a default laser turn-off time, an automatic gain control (AGC) period, and a clock and data recovery (CDR) period;
   wherein a preceding upstream data burst's laser turn-off period overlaps with a subsequent data burst's laser turn-on period;
   wherein the non-overlapping portion of the preceding data burst's laser turn-off period is equal to or greater than twice the allowed maximum jitter of the round-trip time between the central node and a remote node; and
   wherein the non-overlapping portion of the subsequent data burst's laser turn-on period is equal to or greater than twice the allowed maximum jitter of the round-trip time between the central node and a remote node.

22. The computer-readable storage device of claim 21, wherein a grant message specifies a transmission timeslot start time that is earlier than the ending time of an immediately preceding transmission timeslot.

23. The computer-readable storage device of claim 21, wherein receiving a number of upstream data bursts involves receiving a number of consecutive data bursts from a remote node, wherein the remote node is allowed to transmit the number of consecutive data bursts without turning off and turning on its laser between two consecutive data bursts.

24. The computer-readable storage deivce of claim 23, wherein the method further comprises detecting the time gap between two consecutive transmission timeslots assigned to the remote node; and
   if the time gap is less than a pre-defined value, allowing the remote node to transmit upstream data during the time gap without turning off and turning on its laser.

25. The computer-readable storage device of claim 21, wherein if one or more remote nodes are virtual remote nodes located in a common physical remote node, and if these virtual remote nodes transmit upstream data through a common laser belonging to the common physical remote node, the method further comprises:
   allowing the common laser to keep transmitting upstream data without being turned off between consecutive transmission timeslots assigned to one or more virtual remote nodes located in the common physical remote node.

26. The computer-readable storage deivce of claim 25, wherein a grant message contains a laser-turn-on flag and a laser-turn-off flag;
   wherein if a grant message's laser-turn-on flag is true, the corresponding remote node turns on its laser at the start time of its assigned transmission timeslot and transmits an AGC bit sequence and a CDR bit sequence before transmitting upstream data;
   wherein if a grant message's laser-turn-on flag is false, the corresponding remote node immediately starts transmitting upstream data at the start time of its assigned transmission timeslot without transmitting an AGC bit sequence and a CDR bit sequence;
   wherein if a grant message's laser-turn-off flag is true, the corresponding remote node turns off its laser after transmitting upstream data; and
   wherein if a grant message's laser-turn-off flag is false, the corresponding remote node continues transmitting data until the end of its assigned transmission timeslot without turning off its laser.

27. The computer-readable storage device of claim 25, wherein if one or more remote nodes are virtual remote nodes located in a common physical remote node, and if these virtual remote nodes transmit upstream data through a common laser belonging to the common physical remote node, the method further comprises allowing the common laser to keep transmitting the upstream data bursts without being turned off between consecutive transmission timeslots assigned to one or more virtual remote nodes located in the common physical remote node.

28. The computer-readable storage device of claim 21, wherein the method further comprises receiving an actual laser turn-on time and an actual laser turn-off time from a remote node; and
   wherein the actual laser turn-on and turn-off times specify the amount of time required by the remote node to turn on and turn off its laser, respectively.

29. The computer-readable storage device of claim 28, wherein the actual laser turn-on and turn-off times are transmitted with a registration message from the remote node when the central node initially registers the remote node.

30. The computer-readable storage device of claim 28, wherein a grant message assigns a start time and a duration of a transmission timeslot based on the actual laser turn-on and turn-off times of the remote node to which the grant message is destined.

* * * * *

UNITED STATES PATENT AND TRADEMARK OFFICE
CERTIFICATE OF CORRECTION

PATENT NO.        : 7,477,845 B2
APPLICATION NO.   : 10/820663
DATED             : January 13, 2009
INVENTOR(S)       : Glen Kramer It is certified that error appears in the above-identified patent and that said Letters Patent is hereby corrected as shown below:

On the Title Page In Abstract line 5 (Item 57), please replace the word "GNU" with the word --ONU-- so that the line reads: "mission timeslot in which an ONU may transmit an upstream".

In claim 24 (at column 13, line 59), please replace the word "deivce" with the word --device--.

In claim 26 (at column 14, line 14), please replace the word "deivce" with the word --device--.

Signed and Sealed this

Twenty-fourth Day of March, 2009

JOHN DOLL
*Acting Director of the United States Patent and Trademark Office*